US010102519B2

(12) United States Patent
Balar et al.

(10) Patent No.: US 10,102,519 B2
(45) Date of Patent: Oct. 16, 2018

(54) USER INTERFACE TERMINAL WITH RECHARGEABLE BATTERY MODULE

(71) Applicant: Tabletop Media LLC, Dallas, TX (US)

(72) Inventors: Viren R. Balar, Murphy, TX (US); Austen Mulinder, Dallas, TX (US); Christopher M. Wellheuser, Plano, TX (US); Vernon Y. Franklin, Midlothian, TX (US); David C. Perez, Mesquite, TX (US); Jeffrey E. Taylor, Lucas, TX (US)

(73) Assignee: Tabletop Media LLC, Dallas, TX (US)

( * ) Notice: Subject to any disclaimer, the term of this patent is extended or adjusted under 35 U.S.C. 154(b) by 45 days.

(21) Appl. No.: 14/692,259

(22) Filed: Apr. 21, 2015

(65) Prior Publication Data
US 2016/0314454 A1 Oct. 27, 2016

(51) Int. Cl.
*G06Q 20/32* (2012.01)
*H04W 88/06* (2009.01)
(Continued)

(52) U.S. Cl.
CPC ......... *G06Q 20/3227* (2013.01); *G06F 21/72* (2013.01); *G06F 21/86* (2013.01);
(Continued)

(58) Field of Classification Search
CPC .. B60L 11/1824; G06Q 20/027; G06Q 20/32; G06Q 20/3278; G06Q 20/20; G06Q 20/08; G06Q 20/3823; G06Q 20/327; G06Q 20/3227; H01M 2010/4271; H01M 10/4257; H01M 2/30; H01M 10/44; H01M 10/441; H04M 1/0262; H04M 17/023; H04M 1/72527; H04M 1/0254; H04M 1/04; H04M 2250/14; H04W 88/02; H02J 7/0052; G06K 19/0704
(Continued)

(56) References Cited

U.S. PATENT DOCUMENTS 5,949,378 A * 9/1999 Coveley .................. 343/702
6,456,036 B1 * 9/2002 Thandiwe ............ H02J 7/0004
320/106
(Continued)

OTHER PUBLICATIONS

Tichy, Robin Sarah, "Rechargeable Battery Technology for Portable Medical Applications", Rockaway, vol. 10, issue 5, May 2006, pp. 16-18. (Year: 2006).*
(Continued)

*Primary Examiner* — Mohammad Z Shaikh

(57) ABSTRACT

An advanced removable battery module for use in a portable user interface terminal. The battery module comprises a power circuitry module comprising at least one rechargeable battery cell and charging circuitry configured to charge the at least one rechargeable battery cell. The battery module also comprises a communication and encryption circuitry module. The communication and encryption circuitry module comprises a first wireless transceiver configured to communicate with a second module of the user terminal, a second wireless transceiver configured to communicate with a remote terminal separate from the user terminal, and at least one payment transaction interface configured to receive payment information from a user of the user terminal.

20 Claims, 5 Drawing Sheets

(51) Int. Cl.
*H01M 10/42* (2006.01)
*G06F 21/72* (2013.01)
*G06F 21/86* (2013.01)
*H04W 4/00* (2018.01)
*H04W 84/12* (2009.01)
*H04W 4/80* (2018.01)
*H02J 7/00* (2006.01)
*H04W 12/02* (2009.01)

(52) U.S. Cl.
CPC ...... *G06Q 20/327* (2013.01); *H01M 10/4257* (2013.01); *H04W 88/06* (2013.01); *H02J 7/00* (2013.01); *H04W 4/008* (2013.01); *H04W 4/80* (2018.02); *H04W 12/02* (2013.01); *H04W 84/12* (2013.01)

(58) Field of Classification Search
USPC .......................................................... 235/472
See application file for complete search history.

(56) References Cited

U.S. PATENT DOCUMENTS

| | | | | |
|---|---|---|---|---|
| 6,809,649 | B1* | 10/2004 | Wendelrup | H02J 7/0004 320/106 |
| 7,418,272 | B2* | 8/2008 | Son | G06K 19/07743 455/550.1 |
| 7,579,809 | B2* | 8/2009 | Bowles | H01M 10/46 320/107 |
| 7,697,957 | B2* | 4/2010 | Pattenden | G06F 1/26 320/106 |
| 8,074,888 | B2* | 12/2011 | Naccache | G07F 7/0833 235/472.02 |
| 8,391,922 | B2* | 3/2013 | Lee | H04B 1/3816 365/229 |
| 8,824,960 | B2* | 9/2014 | Khan | H04B 5/0031 455/41.1 |
| 8,904,198 | B1* | 12/2014 | Pinto | G07F 15/006 455/572 |
| 9,679,234 | B2* | 6/2017 | Wade | G06K 19/0704 |
| 9,761,928 | B2* | 9/2017 | Han | H01Q 1/243 |
| 2002/0149239 | A1* | 10/2002 | Koljonen | A47C 7/72 297/184.14 |
| 2003/0102842 | A1 | 6/2003 | Tamai et al. | |
| 2005/0178074 | A1* | 8/2005 | Kerosetz | G07G 1/0018 52/36.1 |
| 2005/0197169 | A1* | 9/2005 | Son | G06K 19/07743 455/572 |
| 2006/0064373 | A1* | 3/2006 | Kelley | 705/39 |
| 2006/0064391 | A1* | 3/2006 | Petrov et al. | 705/65 |
| 2006/0085267 | A1* | 4/2006 | Lovegreen | G06Q 10/0639 705/15 |
| 2007/0155443 | A1* | 7/2007 | Cheon | H04B 1/3805 455/572 |
| 2007/0188131 | A1* | 8/2007 | Guthrie | H01M 10/425 320/112 |
| 2008/0037779 | A1* | 2/2008 | Seman, Jr. | H02J 7/0004 380/46 |
| 2008/0157722 | A1* | 7/2008 | Nobutaka | H01M 10/44 320/137 |
| 2009/0018964 | A1* | 1/2009 | Liu | G06Q 20/02 705/76 |
| 2009/0230180 | A1* | 9/2009 | Naccache | G07F 7/0833 235/375 |
| 2010/0048255 | A1* | 2/2010 | Jojivet | G06K 7/0008 455/573 |
| 2010/0210300 | A1* | 8/2010 | Rizzo | G06K 7/0008 455/552.1 |
| 2011/0237190 | A1* | 9/2011 | Jolivet | H04B 5/0081 455/41.2 |
| 2012/0299966 | A1* | 11/2012 | Kim | H02J 17/00 345/660 |
| 2013/0144731 | A1* | 6/2013 | Baldwin et al. | 705/17 |
| 2013/0176104 | A1* | 7/2013 | Rich | H04W 12/06 340/5.8 |
| 2013/0282249 | A1 | 10/2013 | Kato | |
| 2014/0324608 | A1* | 10/2014 | Ko | G06Q 20/207 705/17 |
| 2015/0039450 | A1* | 2/2015 | Hernblad | 705/15 |
| 2016/0004945 | A1* | 1/2016 | Wade | G06K 19/0704 235/492 |
| 2016/0049697 | A1* | 2/2016 | McGee | H01M 2/1022 340/502 |

OTHER PUBLICATIONS

EIC Search Report for U.S. Appl. No. 14/692,259, dated May 29, 2018, pp. 1-26 (Year: 2018).*
International Search Report and Written Opinion in Appl. No. PCT/US2016/28687 dated Oct. 14, 2016.

* cited by examiner

USER INTERFACE TERMINAL WITH RECHARGEABLE BATTERY MODULE

TECHNICAL FIELD

The present application relates generally to an advanced rechargeable smart battery module for use in a portable user interface terminal.

BACKGROUND

Many businesses provide customers with portable terminal devices that operate from a battery source and communicate wirelessly with access points operated by the businesses in their premises. The customers may use these devices, for example, to order food or other products, to view video content (movies, TV shows), to listen to audio content, to play games, and for other related purposes. This list of devices may include, but is not limited to, video gaming consoles, tablet devices, touch screen terminals, and the like. Frequently, these portable user terminals comprise one or more types of well-known electronic payment technology that enable the customer to pay for products or services. Examples of such well-known electronic payment technology include magnetic card readers (i.e., credit card swipe machine), Europay, Mastercard®, Visa® (EMV) chip card readers (i.e., smart card readers), Bluetooth Low Energy (BLE) based payments (i.e., ibeacon), near field communication (NFC) transceivers that often communicate with smartphones, and the like.

As with any type of device that performs financial transactions and transmits wirelessly, information security is important. Therefore, many portable user interface terminals incorporate advanced levels of encryption to protect customer payment information. Information is not only encrypted for transmission over the wireless link, it is also encrypted close to the swipe or contact itself. Thus, credit or debit card information read from a smart card reader will often be stored in encrypted form in memory (e.g., Flash memory, disc drive).

While such portable user interface terminals provide great value to businesses due to the security of card holder data, they also represent a significant financial investment. In addition to the cost of each portable device, a business may also implement one or more wireless access points (e.g., WiFi or similar terminals) that communicate with a central server (optionally). The central server is coupled to the Internet and communicates with financial institutions (i.e., banks, credit card companies).

Due to the ever-evolving nature of hacking threats and digital financial fraud schemes, portable user interface terminals are frequently upgraded to add newly developed and more secure card readers and NFC transceivers, improved encryption, improved tamper protection, and the like. Unfortunately, this frequently means that the portable user interface terminals must be replaced or physically modified. This can be a very expensive proposition for a business that employs a large number of portable user interface terminals, such as a restaurant that provides tabletop terminals to customers or an arcade that provides game consoles to customers.

Therefore, there is a need for improved portable user interface terminals that have lower operating and replacement costs. In particular, there is a need for portable user interface terminals that may be upgraded easily and at low cost.

SUMMARY

To address the above-discussed deficiencies of the prior art, it is a primary object to provide an advanced removable battery module for use in a portable user interface terminal. The battery module comprises: 1) a power management module comprising at least one rechargeable battery cell and charging circuitry with protection circuitry and fuel gauge configured to charge the at least one rechargeable battery cell; and 2) a communication and encryption circuitry module. The communication and encryption circuitry module comprises: i) a first wireless transceiver configured to communicate with a second module of the user terminal; ii) a second wireless transceiver configured to communicate with a remote terminal separate from the user terminal; and iii) at least one payment transaction interface configured to receive payment information from a user of the user terminal.

According to one embodiment of the disclosure, the first wireless transceiver comprises a Bluetooth transceiver.

According to another embodiment of the disclosure, the first wireless transceiver comprises a WiFi transceiver.

According to still another embodiment of the disclosure, the battery module further comprises a wire line interface configured to communicate with the second module of the user terminal.

According to yet another embodiment of the disclosure, the wire line interface comprises a serial input/output interface.

According to a further embodiment of the disclosure, the at least one payment transaction interface comprises a smart card reader interface.

According to a still further embodiment of the disclosure, the at least one payment transaction interface comprises a near field communication (NFC) interface.

According to a yet further embodiment of the disclosure, the battery module further comprises a secured storage configured to store sensitive information in an encrypted format.

According to one embodiment of the disclosure, the communication and encryption circuitry module is configured to establish a connection with the remote terminal when the battery module is recharging in order to download at least one of software updates and security patches.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 5, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged portable user interface terminal.

The present disclosure describes an improved portable user interface terminal that operates from a removable, rechargeable battery module. According to the principles of the disclosure, the hardware and firmware that must frequently be upgraded is removed from the main body of the portable user interface terminal and is implemented in the battery module instead. Advantageously, the cost of upgrading the disclosed portable user interface terminal is reduced since only the removable, rechargeable battery module needs to be replaced, if necessary, rather than the entire device.

Thus, the main body of the portable user interface terminal may comprise, for example, a microprocessor, random access memory (RAM), a touch screen along with LCD, an internal thermal printer, a camera, LEDs, and similar components that are not often upgraded or replaced. In turn, the removable battery module may comprise encryption hardware and firmware, secure storage, a smart card reader, a near field communication (NFC) transceiver, and one or more tamper prevention devices. In an advantageous embodiment, each of the main body of the portable user interface terminal and the battery module comprises a short-range wireless transceiver, such as Bluetooth transceiver, for communicating on secure encrypted channels.

Figure 1:
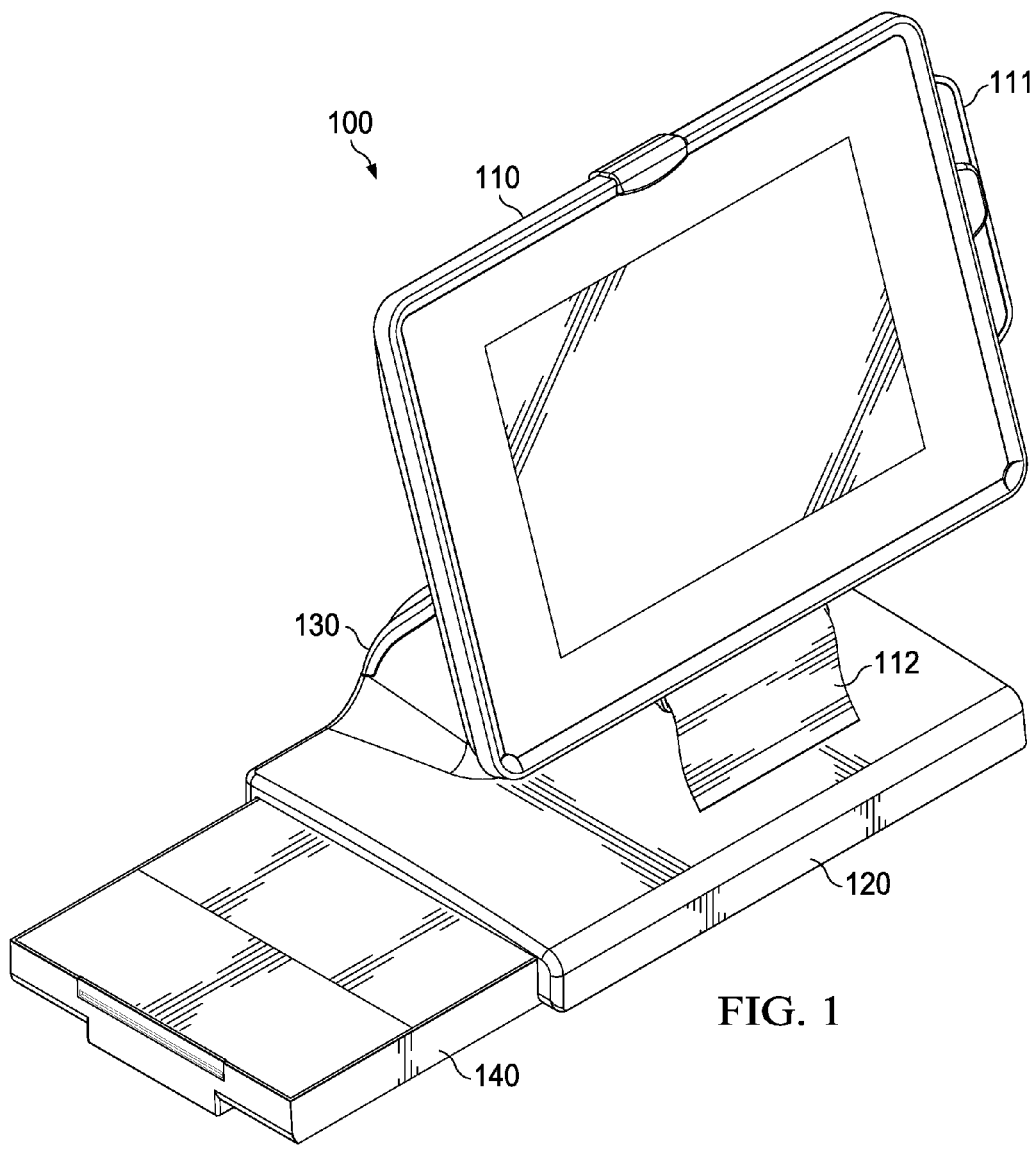
FIG. 1 illustrates an exemplary portable user interface terminal in accordance with one embodiment of the disclosure.

FIG. 1 is a perspective view of exemplary portable user interface terminal 100 in accordance with one embodiment of the disclosure. Portable user interface terminal 100 comprises display module 110, base 120, support 130, and removable battery module 140. For ease of explanation, battery module 140 is shown partially removed from base 120. Base 120 is typically placed on a countertop or a tabletop and support 130 holds display module 110 in an elevated position with the display screen inclined to make viewing easy. In some embodiments, display module 110 may comprise credit card swipe device 111 and an internal thermal printer (not shown) that prints receipt 112 for a customer.

In an advantageous embodiment of the disclosure, battery module 140 comprises a smart card reader and an NFC antenna and transceiver. When battery module 140 is fully inserted into base 120, the external end of battery module 140 is substantially flush with the end of base 120. The smart card reader may be disposed near the external end of battery module 140, so that when battery module 140 is fully inserted into base 120, an EMV card (i.e., smart card) may be easily inserted into the smart card reader for payment purposes. Also, the NFC antenna may be disposed on an upper surface of battery module 140, so that when battery module 140 is inserted into base 120, the NFC antenna is faced upwards just inside the shell of base 120. In such an arrangement, another NFC-capable device (e.g., a smartphone with an NFC antenna and transceiver) that is brought within a few inches of the upper surface of base 120 may communicate with the NFC antenna and transceiver of battery module 140.

Figure 2:
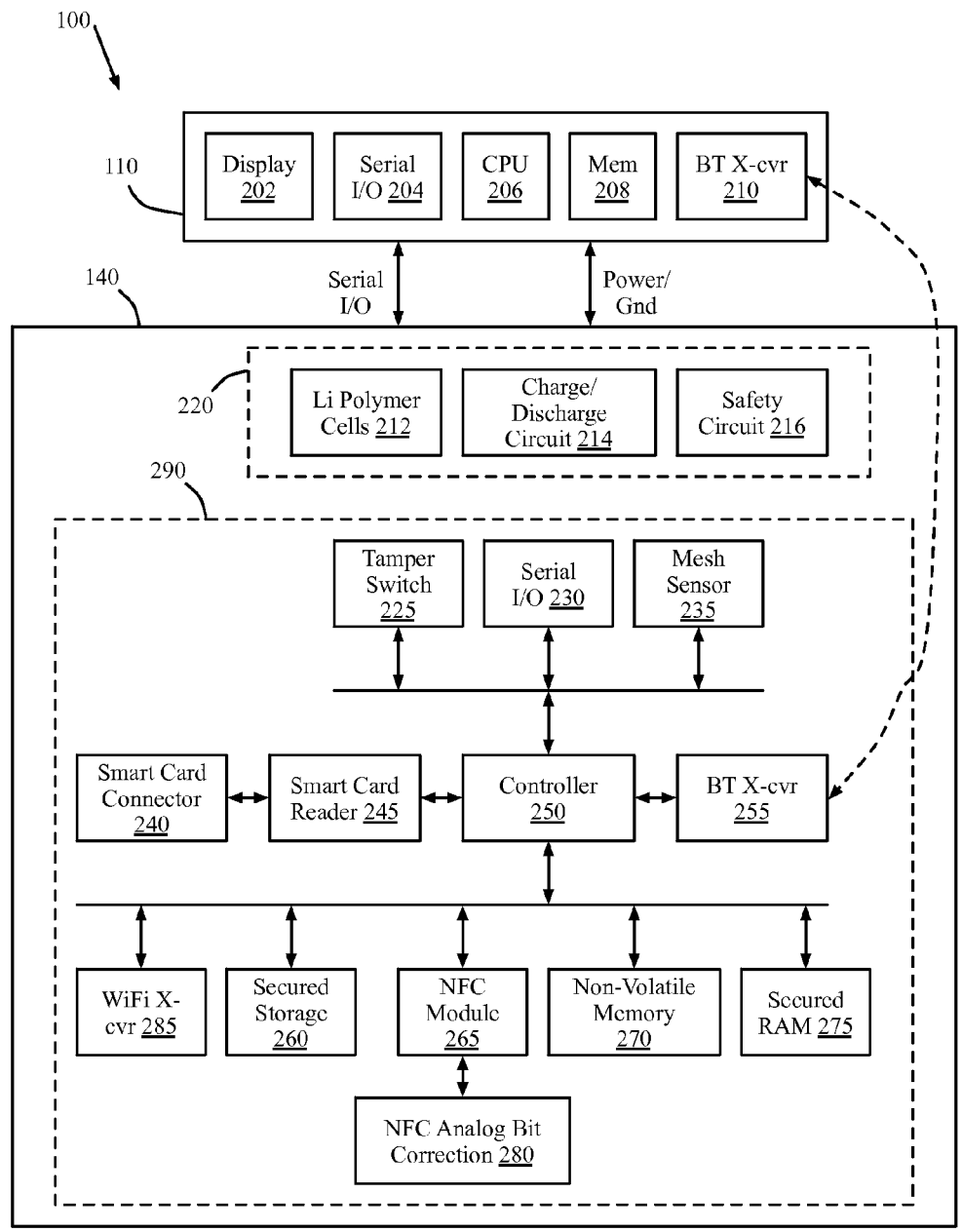
FIG. 2 illustrates in detail an exemplary portable user interface terminal according to one embodiment of the disclosure.

FIG. 2 illustrates a detailed schematic of exemplary portable user interface terminal 100 in accordance with one embodiment of the disclosure. Base 120 and support 130 are not shown in order to simply the explanation of the interaction between the electronic components of display module 110 and battery module 140. In one embodiment of the disclosure, the wired electrical connections between display module 110 and battery module 140 include a power connection and a ground connection (Power/Gnd), as well as a serial input/output (I/O) interface connection. Advantageously, the electronic components of display module 110 and battery module 140 also communicate over a Bluetooth wireless connection, as indicated by a dotted line in FIG. 2.

Display module 110 comprises display screen 202, serial I/O interface 204, central processing unit (CPU) 206, memory 208, and Bluetooth (BT) transceiver (X-cvr) 210. CPU 206 controls the overall operation of display module 110. According to an exemplary embodiment, memory 208 may comprise volatile memory (e.g., RAM) and non-volatile memory (i.e., flash). The non-volatile memory is configured to store an operating system program (not shown) and a plurality of application programs (not shown) that are loaded into RAM and executed by CPU 206 during normal operation. In an advantageous embodiment, display screen 202 may comprise a touch screen that enables a user to interact with terminal 100 through menus and a keyboard that may appear on the display.

In normal operation, CPU 206 may use Bluetooth transceiver 210 to communicate wirelessly with Bluetooth transceiver 255 in battery module 140. However, in certain situations, CPU 206 also may use serial I/O interface 204 to communicate by wire line with serial I/O interface 230 in battery module 140. For example, the 2.4 GHz spectrum used by Bluetooth may be used in a restaurant, arcade or office communication over codeless phones or WLAN, thereby limiting or interfering with communications between Bluetooth transceiver 210 and Bluetooth transceiver 255. Under such conditions, CPU 206 may optionally switch to communicating via serial I/O interface 204 and serial I/O interface 230. Advantageously, CPU 206 may use serial I/O interface 204 to automatically pair Bluetooth transceiver 210 and Bluetooth transceiver 255 in a secure manner prior to sending critical information via the wireless Bluetooth link. This provides an additional layer of secure, encrypted communication between display module 110 and battery module 140. In one embodiment, communication between serial I/O interface 204 and serial I/O interface 230 may be implemented via an edge connector on battery module 140 that mounts in a slot connector in base 120 of terminal 100.

Battery module 140 comprises power circuitry module 220 and communication and encryption circuitry module 290. Power circuitry module 220 comprises lithium (Li) polymer cells 212, charge/discharge circuitry 214, and safety circuitry 216. Battery module 140 may be removed from user interface terminal 100 and connected to an external voltage source, such as a charging stand. In a charging mode of operation, charge/discharge circuitry 214 receives power from the external voltage source and converts the external voltage to an appropriate level that is used to charge lithium polymer cells 212. In a discharging mode of operation (i.e., when battery module 140 is powering terminal 100), charge/discharge circuitry 214 receives power from lithium polymer cells 212 and converts the battery voltage to an appropriate level that powers both display module 110 and all of the components in battery module 140.

Safety circuitry 216 may comprise, by way of example, over-voltage detection circuitry, short-circuit detection circuitry, a heat sensor, and the like. Upon detection of a dangerous condition (e.g., excessive voltage, current, temperature) safety circuitry 216 may shut off power from the battery cells for safety reasons.

Communication and encryption circuitry module 290 comprises tamper switch 225, serial I/O interface 230, mesh sensor 235, smart card connector 240, smart card reader 245, controller 250, Bluetooth (BT) transceiver (X-cvr) 255, secured storage 260, near field communication (NFC) module 265, non-volatile memory 270, secured random access memory (RAM) 275, near field communication (NFC) analog bit connection circuitry 280, and WiFi transceiver 285.

Controller 250 controls the overall operation of communication and encryption circuitry module 290. According to an exemplary embodiment, controller 250 may be implemented as a microprocessor or a microcontroller. Non-volatile memory 270 is configured to store an operating system program (not shown) and a plurality of application programs (not shown) that are loaded into secured RAM 275 and executed by controller 250 during normal operation. In normal operation, controller 250 may use Bluetooth transceiver 255 to communicate wirelessly with Bluetooth transceiver 210 and CPU 206 in battery module 140. As noted, however, in certain situations, controller 250 and CPU 206 may use serial I/O interface 204 and serial I/O interface 230 to communicate by wire line.

Mesh sensor 235 is a mesh circuit that may be embedded in a printed circuit board (PCB). If someone tries to cut or drill through the PCB to cut traces in order to get secured information, mesh sensor 235 detects the attempt to cut or drill the PCB and sends a signal to tamper switch 225. In response, tamper switch generates an alert signal that causes controller 250 to erase any secured or private information stored in secured storage 260 or secured RAM 275. Also, for security reasons, controller 250 stores sensitive data, such as encryption algorithms, security software patches, and private information, in encrypted form in secured storage 260.

In addition to communicating with display module 110 via Bluetooth transceiver 210, controller 250 also communicates via WiFi transceiver 285 with other remote terminals that are external to user interface terminal 100, such as a central server of the business. This enables the user of user interface terminal 100 to interact with the central server and/or external data networks, such as the Internet. For example, in a restaurant environment, a user can place a food order using the display screen 202 of user interface terminal 100. Controller 250 then relays the order information via WiFi transceiver 285 to the central server of the restaurant. Other examples of remote terminals may include any wireless capable device, including laptop and desktop computers, tablets, smartphones, and the like.

Similarly, a user can pay for a meal using a smart card or an NFC-enable smart phone. Controller 250 reads a smart card by means of smart card connector 240 and smart card reader 245. The secured information from the smart card is then transmitted in encrypted form via WiFi transceiver 285 to the central server. The central server of the restaurant may then establish an Internet connection to the financial institution that issued the smart card in order to complete the transaction. In a like manner, controller 250 uses NFC module 265 and NFC analog bit correction circuitry 280 to communicate with a smart phone or similar device that has NFC capabilities. Alternatively, if no central server is implemented, controller 250 may communicate directly with a financial institution or other external network node via the Internet.

The disclosed architecture of user interface terminal 100 provides improved capabilities for upgrading or replacing outdated parts of user interface terminal 100 at a lower cost. Wherever improved hardware or firmware becomes available, such as improved smart card readers, improved NFC transceivers, more powerful encryption algorithms, and the like, the hardware and firmware that most likely must be upgraded is implemented in the removable battery module. The battery module may be replaced entirely or may receive software patches that are downloaded when the battery is removed. Furthermore, since lithium (Li) polymer cells 212 (or similar chemical cells) will normally degrade over time, the regular, periodic replacement of lithium (Li) polymer cells 212 will also result in replacement of communication and encryption circuitry module 290.

Figure 3:
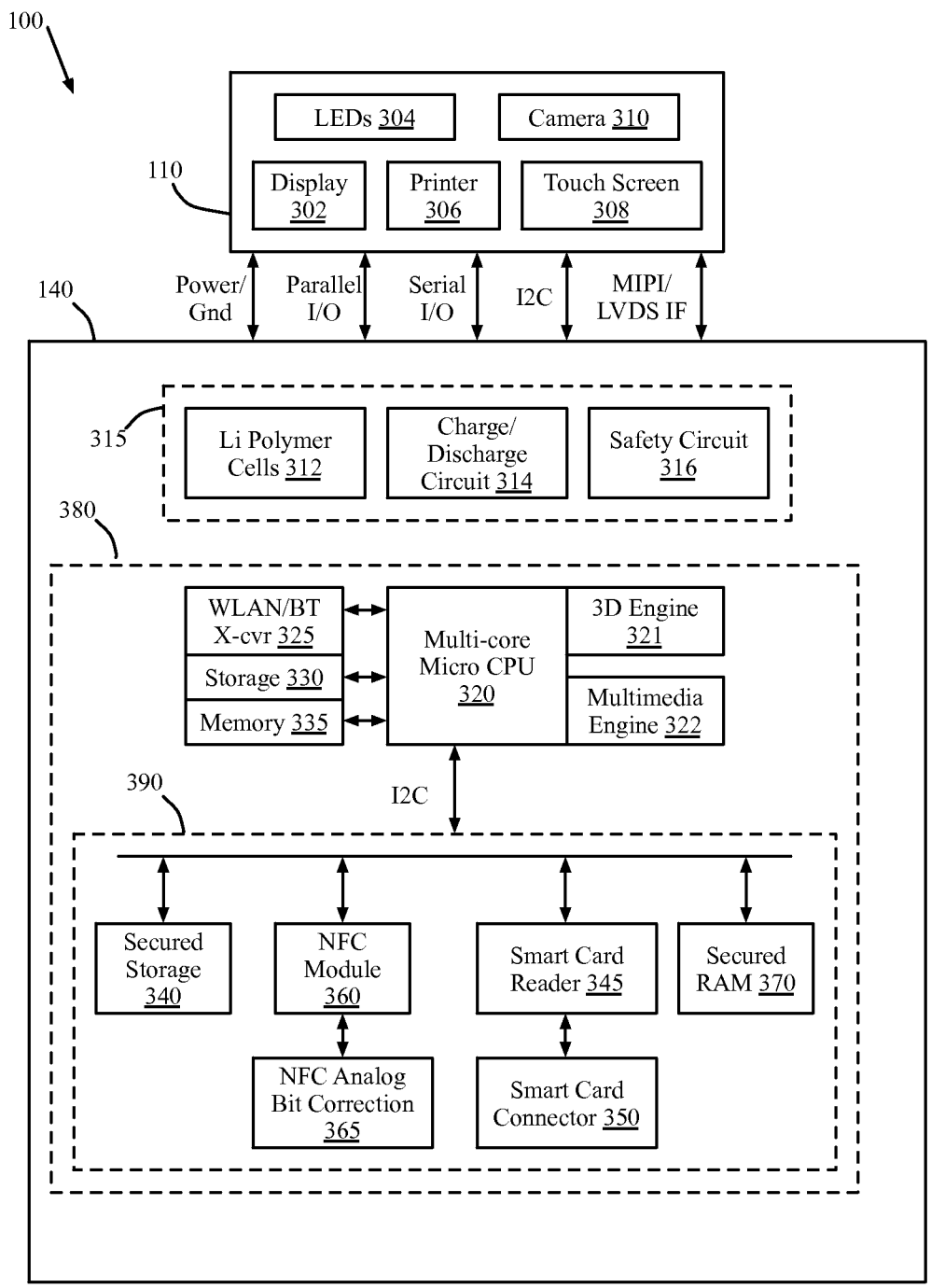
FIG. 3 illustrates in detail an exemplary portable user interface terminal according to an alternate embodiment of the disclosure.

FIG. 3 illustrates in detail exemplary portable user interface terminal 100 according to an alternate embodiment of the disclosure. Base 120 and support 130 are not shown in order to simply the explanation of the interaction between the electronic components of display module 110 and battery module 140. In the alternate embodiment, the wired electrical connections between display module 110 and battery module 140 include a power connection and a ground connection (Power/Gnd), a parallel input/output (I/O) interface connection, a serial I/O interface connection, an inter-integrated circuit ($I^2C$) interface, and a mobile industry processor interface (MIPI), which may be, for example, a low-voltage differential signal (LVDS) interface (IF). In the alternate embodiment, battery module 140 and display module 110 may communicate with each other entirely by wireline connections. This avoids the need for a wireless transceiver 210 in display module 110.

Most of the components in FIG. 3 perform the equivalent functions of their counterpart components in FIG. 2 and need not be discussed in additional detail. Display module 110 comprises display 302, light emitting diodes (LEDs) 304, printer 306, and camera 310. Display 302 may include touch screen 308 that enables a user to interact with terminal 100 through menus and a keyboard that may appear on the display.

Battery module 140 comprises power circuitry module 315 and communication and encryption circuitry module 380. Power circuitry module 315 comprises lithium (Li) polymer cells 312, charge/discharge circuitry 314, and safety circuitry 316. Battery module 140 may be removed from user interface terminal 100 and connected to an external voltage source, such as a charging stand. In a charging mode of operation, charge/discharge circuitry 314 receives power from the external voltage source and converts the external voltage to an appropriate level that is used to charge lithium polymer cells 312. In a discharging mode of operation (i.e., when battery module 140 is powering terminal 100), charge/discharge circuitry 314 receives power from lithium polymer cells 312 and converts the battery voltage to an appropriate level that powers both display module 110 and all of the components in battery module 140.

Communication and encryption circuitry module 380 comprises secure module 390, multi-core microprocessor (CPU) 320, WLAN/BT transceiver 325, storage 330, and memory 335 (i.e., RAM). Secure module comprises secured storage 340, smart card reader 345, smart card connector 350, near field communication (NFC) module 360, near field communication (NFC) analog bit connection circuitry 365, and secured random access memory (RAM) 370.

CPU 320 may further comprise 3D engine 321 and multimedia engine 322. CPU 320 is responsible for the overall operation of communication and encryption circuitry module 380, as well as the rest of terminal 100. Storage 330 stores an operating system program (not shown) and a plurality of application programs (not shown) that are loaded into memory 335 and executed by CPU 320 during normal operation. In normal operation, CPU 320 may use WLAN/BT transceiver 325 to communicate wirelessly.

Figure 4:
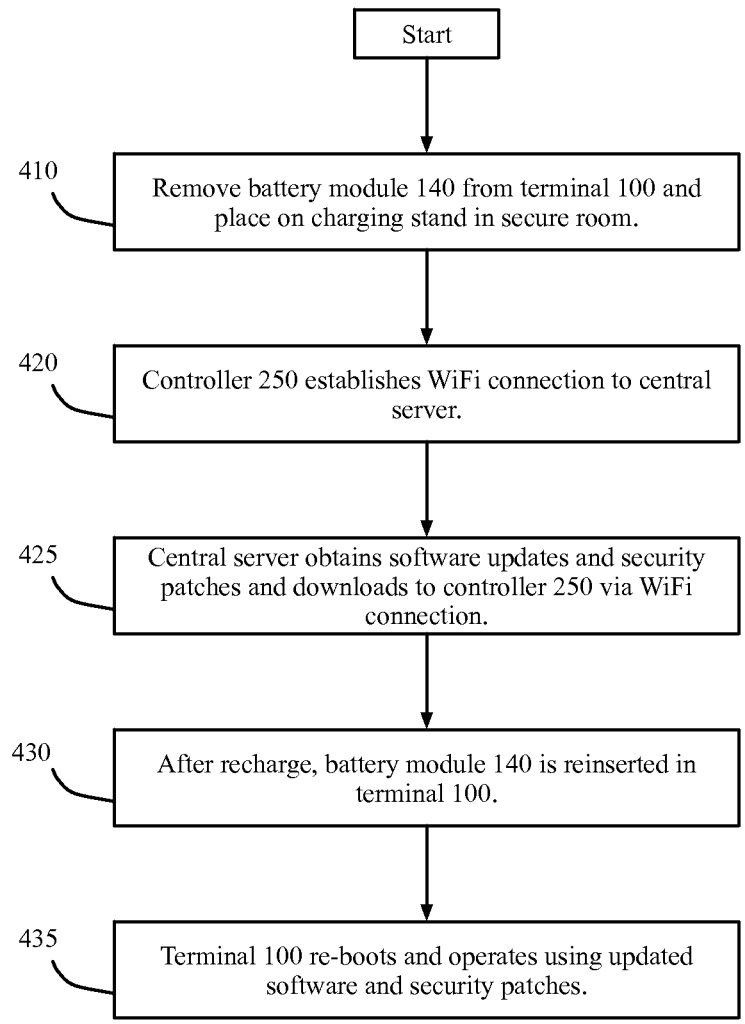
FIG. 4 is a flow diagram illustrating an update operation of the exemplary portable user interface terminal in accordance with one embodiment of the disclosure.

FIG. 4 is a flow diagram illustrating an update operation of exemplary portable user interface terminal 100 in accordance with one embodiment of the disclosure. After a business is closed or if a battery is running low, battery module 140 is removed from terminal 100 and placed on a charging stand in a secure room of the business premises (step 410). While the battery module is recharging, controller 250 establishes a WiFi connection to the central server of the business (step 420). In response to the connection, the central server obtains software updates and security patches for battery module 140 and downloads software updates and security patches to controller 250 via the WiFi connection (step 430). Controller 250 then applies the downloaded software updates and security patches. After the recharge operation is completed, battery module 140 is reinserted in terminal 100 (step 440). Terminal 100 then re-boots and operates using the updated software and security patches that have been applied in communication and encryption circuitry module 290 by controller 250 (step 450).

Figure 5A:
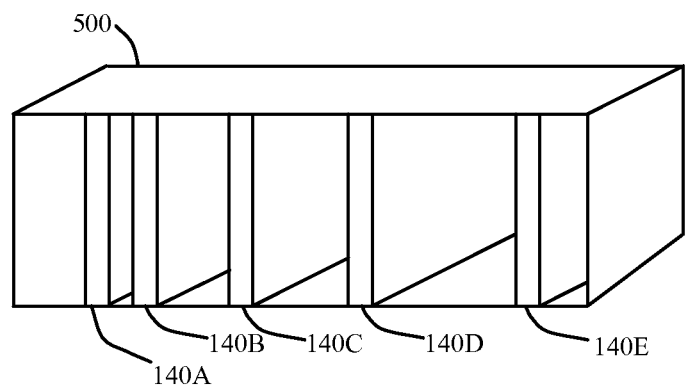
FIGS. 5A and 5B are perspective views of a battery charger according to an embodiment of the disclosure.
Figure 5B:
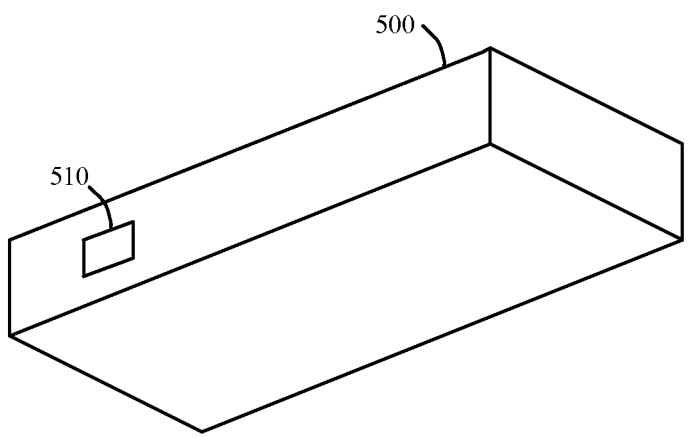

FIGS. 5A and 5B are perspective views of battery charger 500 according to an embodiment of the disclosure. Battery charger comprises a power module (not shown) that supplies power to multiple connector slots into which battery modules may be inserted. In FIG. 5A, five battery modules (i.e., battery modules 140A, 140B, 140C, 140D and 140E) are inserted in battery charger 500 for charging. As shown in FIG. 5B, cooling fan 510 vents excess heat in battery charger 500. When battery module 140 is inserted in battery charger 500, the exemplary update operation in FIG. 4 may be performed.

The disclosure above describes an advantageous embodiment in which wireless transceivers are used to communicate with a remote terminal. However, in an alternate embodiment, battery module 140 may use a wireline connection to communicate with a remote terminal. By way of example, battery module 140 may use the serial I/O and/or parallel I/O connections to communicate with corresponding serial I/O or parallel I/O connections in batter charger 500.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A battery module configured to be removably inserted into a user terminal, the battery module comprising:
    a power circuitry module comprising at least one rechargeable battery cell and charging circuitry configured to charge the at least one rechargeable battery cell; and
    a communication and encryption circuitry module comprising:
        a first wireless transceiver configured to communicate with a second module of the user terminal;
        a second wireless transceiver configured to communicate with a remote terminal separate from the user terminal;
        an encryption controller configured to encrypt communications with the second module of the user terminal via the first wireless transceiver; and
        at least one payment transaction interface configured to receive payment information from a user of the user terminal.

2. The battery module as set forth in claim 1, wherein the first wireless transceiver comprises a Bluetooth transceiver.

3. The battery module as set forth in claim 1, wherein the first wireless transceiver comprises a WiFi transceiver.

4. The battery module as set forth in claim 1, further comprising a wire line interface configured to communicate with the second module of the user terminal.

5. The battery module as set forth in claim 4, wherein the wire line interface comprises a serial input/output interface.

6. The battery module as set forth in claim 1, wherein the at least one payment transaction interface comprises a smart card reader interface.

7. The battery module as set forth in claim 1, wherein the at least one payment transaction interface comprises a near field communication (NFC) interface.

8. The battery module as set forth in claim 1, further comprising a secured storage configured to store sensitive information in an encrypted format.

9. The battery module as set forth in claim 1, wherein the communication and encryption circuitry module is configured to establish a connection with the remote terminal when the battery module is recharging in order to download at least one of software updates and security patches.

10. A user terminal comprising:
    a display module comprising a display screen and an interface circuitry configured to receive a user input; and
    a battery module configured to be removably inserted into the user terminal the battery module comprising:
        a power circuitry module comprising at least one rechargeable battery cell and charging circuitry configured to charge the at least one rechargeable battery cell; and
        a communication and encryption circuitry module comprising:
        a first wireless transceiver configured to communicate with the display module;
        a second wireless transceiver configured to communicate with a remote terminal separate from the user terminal;
        an encryption controller configured to encrypt communications with the second module of the user terminal via the first wireless transceiver; and
        at least one payment transaction interface configured to receive payment information from a user of the user terminal.

11. The user terminal as set forth in claim 10, wherein the first wireless transceiver comprises a Bluetooth transceiver.

12. The user terminal as set forth in claim 10, wherein the first wireless transceiver comprises a WiFi transceiver.

13. The user terminal as set forth in claim 10, further comprising a wire line interface configured to communicate with the display module.

14. The user terminal as set forth in claim 13, wherein the wire line interface comprises a serial input/output interface.

15. The user terminal as set forth in claim 10, wherein the at least one payment transaction interface comprises a smart card reader interface.

16. The user terminal as set forth in claim 10, wherein the at least one payment transaction interface comprises a near field communication (NFC) interface.

17. The user terminal as set forth in claim 10, further comprising a secured storage configured to store sensitive information in an encrypted format.

18. The user terminal as set forth in claim 10, wherein the communication and encryption circuitry module is configured to establish a connection with the remote terminal when the battery module is recharging in order to download at least one of software updates and security patches.

19. A battery module for use in a user terminal, the battery module comprising:
- a power circuitry module comprising at least one rechargeable battery cell and charging circuitry configured to charge the at least one rechargeable battery cell; and
- a communication and encryption circuitry module comprising:
  - a wireline interface configured to communicate with a second module of the user terminal;
  - a wireless interface configured to communicate with a remote terminal separate from the user terminal;
  - an encryption controller configured to encrypt communications with the second module of the user terminal via the wireline interface; and
  - at least one payment transaction interface configured to receive payment information from a user of the user terminal.

20. The battery module as set forth in claim 19, wherein the communication and encryption circuitry module is configured to establish a connection with the remote terminal when the battery module is recharging in order to download at least one of software updates and security patches.

* * * * *